Dec. 4, 1934.  J. L. CHANEY ET AL  1,983,166
THERMOMETER
Filed June 28, 1934
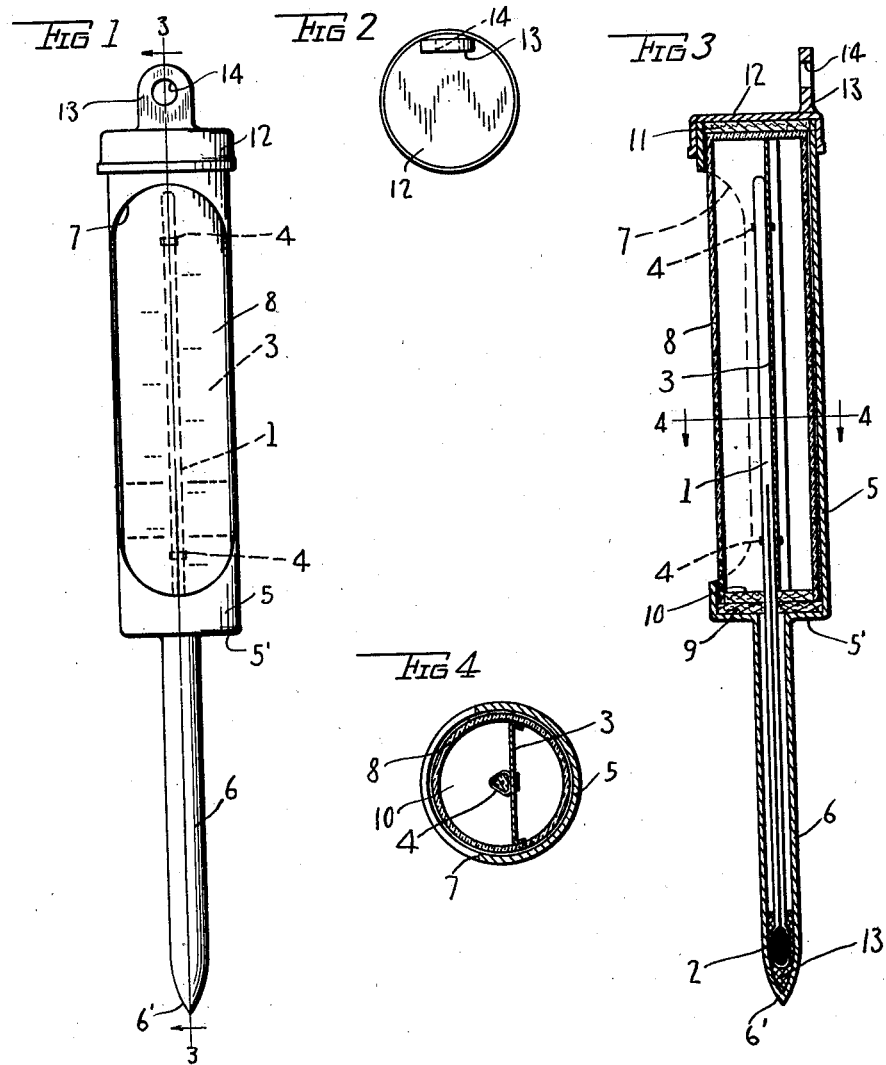
INVENTORS.
John L. Chaney
William Kenneth Yates
BY
Staley + Welch
ATTORNEYS.

Patented Dec. 4, 1934

1,983,166

UNITED STATES PATENT OFFICE 1,983,166

THERMOMETER

John L. Chaney, Springfield, Ohio, and William Kenneth Yates, Chicago, Ill.

Application June 28, 1934, Serial No. 732,888

5 Claims. (Cl. 73—52)

This invention relates to improvements in thermometers, it relating more particularly to that class of thermometers intended to ascertain the interior temperature of articles.

The thermometer as shown in the drawing is especially intended for use in the curing of meats particularly those portions which are prepared for the market in pieces of relatively large bulk, a ham being an illustration of a portion of meat having bulk, there being a distance of several inches from the surface to the center in an average ham. In the process for which the invention is intended, the meat is brought to and maintained at a certain temperature, and as it is the interior temperature of the meat and not the temperature of the room which is essential, the thermometer of the invention is arranged to be deeply inserted in the meat and left there until it is certain that the reading thereof is a correct indication of the temperature of the interior of the meat.

Since in the present instance, the total expense of the device is kept to a low point by the use of the effective and inexpensive glass thermometer element, which is relatively fragile in any event and slightly more so in the present case because of the necessary length of the element, a casing has been devised for the element for the protection of the same, and in order to provide good thermal conductivity of the bulb of the element and the article, the casing is formed of metal.

Therefore, one of the objects of the invention is the provision of an inexpensive metallic casing for the thermometer element.

Another object is the provision of a portion of the casing so shaped as to permit ready piercing and insertion thereof in any substance in which the device may penetrate, with a further more specific object of providing a good thermal path for the travel of the heat of the substance to the bulb of the thermometer element.

Another object is the provision of a transparent enclosure for the scale card of the element whereby in any process such as the curing of meats where grease is encountered, the scale card is kept in perfect condition, the glass enclosure being easily wiped off and cleaned.

Another object is the provision of resilient shock-absorbing means designed to prevent damage to the thermometer element, more particularly referring to the upper extremity thereof.

Other objects and advantages will be apparent in the following specifications and claims.

In the accompanying drawing:

Fig. 1 is a front elevation of the improved device.

Fig. 2 is a top plan view.

Fig. 3 is a vertical or longitudinal section on the line 3—3 of Fig. 1.

Fig. 4 is an enlarged transverse section on the line 4—4 of Fig. 3.

Referring to the drawing, the thermometer element body is indicated at 1, and as is well known in the art, is a glass tube closed at the upper end and having a bulb 2 blown in the lower end in which the temperature responsive fluid is received. It will be noticed that the element is relatively long because, as previously stated, it is very desirable in some cases to insert the bulb well within the interior of the article whose internal temperature is to be shown. The scale card is indicated at 3 and is clipped to the upper portion of the element with the usual clips 4. The scale card may be graduated with any sort of indicia suitable for the purpose for which the device is intended.

An outer metallic casing is provided consisting of a main cylindrical section 5 having an elongated, materially reduced cylindrical axial extension 6, the upper end of the casing being opened and closed by a cap 12. The extension is shown as integrally formed with the lower end 5' of the main section and in communication with each other.

The extension 6 is relatively small in diameter because it is the portion of the holder which is thrust into the article and further is closed and pointed at its lower end 6' for more ready insertion.

The internal diameter is such that the thermometer glass tube may be freely inserted therein with only slight clearance, and in connection with the external diameter mentioned, relatively thin walls for the extension 6 are obtained. While not essential, it is preferable that the walls of the extension 6 be comparatively thin, whereby there is provided a minimum of metal for the heat to travel through.

The extension of the casing encloses approximately half the length of the thermometer tube and is sufficiently long to insure that the bulb end thereof may be inserted suitably deep in the article whose temperature is to be taken. Obviously, the upper end of the thermometer tube must be visible but preferably also enclosed to prevent breakage or damage; therefore, the upper portion of the thermometer element is housed within the main section 5 of the casing which, as stated, is integrally attached to the upper end of the extension 6 and is itself open at its upper end for the purpose of assembling the parts therein. To provide visibility, a longitudinal opening 7 is formed in the side wall of the main section, this opening extending almost halfway around the wall and for almost the total length of the section.

As previously mentioned, the scale card 3 is protected but still made visible, this being obtained by the use of a glass tube 8 which in the present case is closed at one end.

To protect the thermometer element against breakage such as might occur by dropping or other rough handling where the otherwise comparatively free upper portion might snap and break from the lower portion, use is made of the scale card to partially brace the element. As stated, the scale card is clipped to the thermometer stem, and the glass enclosure 8 is slipped downwardly over the stem and card. Since the card is of such size as to rather tightly fit in the glass enclosure 8, and since the latter member is tightly held in the holder on assembly, the element has the protection afforded by the construction described.

The element is further protected by the use of a pair of resilient disk-like members of rubber, felt or other suitable material, one of which acts as a cushion for the glass enclosure 8. Referring to Fig. 3, the glass enclosure 8 is seen resting upon a lower disk 9 through which the element is inserted at its central portion. Upon this disk and within the lower end of the glass enclosure 8 is a second disk 10 of smaller diameter, this diameter being just so that a fairly snug fit of the disk 10 in the glass enclosure is obtained. This disk 10 is also provided with an opening at its central portion, which opening is gauged so that the element is comparatively tightly gripped when the element is thrust therethrough.

The device is assembled as follows: The element 1 is inserted first through the disk 9, then through the disk 10, after which the scale card 3 is clipped in place on the upper portion of the element. Into the interior of the extension 6 is dropped a pellet of plastic material having a comparatively low melting, such as beeswax, and after slightly heating the bulb end of the element, the element is inserted in the casing and pressed down into the beeswax which softens and flows around the bulb, the plastic material providing a sufficiently good thermal path as the material adheres and makes intimate contact with both the bulb and the interior surface of the extension 6, and there is no need of blowing a specially formed bulb on the element.

The glass enclosure 8 is then placed in position in the main section of the casing and over the upper end of the element and the scale card, resting on the resilient member 9 and enclosing the upper disk 10, the thickness of which is gauged so as to cause the bottom edge of the scale card to embed itself slightly in the upper surface of the disk 10 when a pressure is put upon the glass enclosure 8.

Such pressure is later applied, as on the upper closed end of the glass enclosure 8 there is placed a resilient disk 11, which may be similar to the disk 9 except that no central opening is needed. The thickness of the upper disk 11 is such that at this point of the assembly, this disk will project slightly above the upper edge of the main section 5; therefore, when the cap 12 is placed over the end of the section 5, the pressure of the cap on the disk 11 is transmitted to the glass enclosure, which in turn transmits a portion of the pressure to the scale card, and to the disk 9, whereby all are snugly held without putting end pressure on the thermometer element. The cap is preferably so fitted as to have a press fit on the main section 5, therefore, when once in place, there is no loosening of the parts in ordinary service. Projecting from the upper surface and at one side thereof is a lug 13 through which is provided an opening 14 whereby the device may be hung when desired.

Having thus described our invention, we claim:

1. In a thermometer, a metallic casing formed with a main cylindrical section and a reduced cylindrical extension, the main section being open at its upper end and having a part of its side wall cut away, the reduced extension being closed throughout its length and provided with a pointed lower end, a glass tube located in the main section of said main casing, a thermometer tube in said glass tube and extending throughout the length of said extension, a scale card attached to said thermometer tube and located in said glass tube and held against lateral displacement thereby, and a cap to close the open end of said main section of the casing and exerting pressure on said glass tube.

2. In a thermometer, a metallic casing formed with a main cylindrical section and a reduced cylindrical axial extension formed integrally with the lower end of said main section, said main section being open at its upper end and having a part of its side wall cut away, the reduced extension being closed throughout its length and provided with a pointed lower end, a glass tube located in the main section of said casing open at its lower end and closed at its upper end, a disk of flexible material between the lower open end of said glass tube and the lower end of said main section, a thermometer tube in said glass tube and extending throughout the length of said extension, a scale card attached to said thermometer tube and located in said glass tube and held against lateral displacement thereby, a disk of flexible material on the upper closed end of said glass tube and a cap to close the open end of said main section of said casing and exerting pressure on the upper end of said lastmentioned flexible disk.

3. In a thermometer, a metallic casing formed with a main cylindrical section and a reduced cylindrical axial extension formed integrally with the lower end of said main section, said main section being open at its upper end and having a part of its main side wall cut away, the reduced extension being closed throughout its length and provided with a pointed lower end, a glass tube located in the main section of said main casing open at its lower end and closed at its upper end, a disk of flexible material between the lower open end of said glass tube and the lower end of said main section, a second disk of flexible material fitted in the open end of said glass tube, a thermometer tube in said glass tube and extending throughout the length of said extension, said disks being perforated to receive said thermometer tube with a snug fit, a scale card attached to that portion of the thermometer tube which is located in the glass tube and held against lateral displacement by said glass tube, and a removable cap to close the upper end of said main section and adapted to exert pressure on said glass tube.

4. In a thermometer, a metallic casing formed with a main cylindrical section and a reduced cylindrical axial extension formed integrally with the lower end of said main section, said main section being open at its upper end and having a part of its side wall cut away, the reduced extension being closed throughout its length and provided with a pointed lower end, a glass tube located in the main section of said casing open at its lower end and closed at its upper end, a disk of flexible material between the lower open end of said glass tube and the lower end of said main section, a thermometer tube in said glass tube and extending throughout the length of said extension through an aperture in said flexible disk, a scale card attached to said thermometer tube and located in said glass tube and held against lateral displacement thereby, a plastic substance located in the extreme lower end of said casing extension to receive the bulb of said thermometer tube, and a cap to close the open end of said upper end of said main casing and adapted to exert pressure on said glass tube.

5. In a thermometer, a metallic casing formed with a main tubular section and a reduced tubular axial extension formed integrally with the lower end of said main section, said main section being open at its upper end and having a portion of its side wall cut away, the reduced extension having imperforate side walls and a closed pointed lower end, a glass tube located in the main section of said casing open at its lower end and closed at its upper end, a disk of resilient material having an aperture at its central portion, said disk being located between the open lower end of the glass tube and the lower end of the main section, a thermometer tube extending substantially throughout the lengths of the main section and the reduced extension with its bulb end in but slightly separated from the closed pointed end of the reduced extension, the thermometer tube extending through the central aperture in the said resilient disk, a second centrally apertured resilient disk resting on the first mentioned resilient disk, a scale card attached to the upper portion of said thermometer tube and located in said glass tube and held against lateral displacement by the said glass tube and against longitudinal displacement by the upper closed end of the said glass tube and said second resilient disk, and a plastic substance located in the extreme lower end of the closed pointed end of the reduced extension to receive the bulb of the said thermometer tube, a resilient disk on top of the glass tube, and a cap adapted to be forcibly pressed onto and to close the upper open end of the said main section and exerting pressure on the glass tube through the medium of the last mentioned resilient disk.

JOHN L. CHANEY.
WILLIAM KENNETH YATES.